United States Patent
Lim (10) Patent No.: US 9,869,236 B2
(45) Date of Patent: Jan. 16, 2018

(54) AIR INTAKE CONTROL SYSTEM FOR ENGINE AND METHOD OF CONTROLLING THE SAME

(71) Applicants: Hyundai Motor Company, Seoul (KR); Kia Motors Corp., Seoul (KR)

(72) Inventor: Jae Pil Lim, Whasung-Si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 266 days.

(21) Appl. No.: 14/559,019

(22) Filed: Dec. 3, 2014

(65) Prior Publication Data

US 2015/0354440 A1   Dec. 10, 2015

(30) Foreign Application Priority Data

Jun. 10, 2014   (KR) .................... 10-2014-0070000

(51) Int. Cl.
*F02B 37/16*   (2006.01)
*F02B 33/44*   (2006.01)
(Continued)

(52) U.S. Cl.
CPC .............. *F02B 37/16* (2013.01); *F02B 33/44* (2013.01); *F16K 31/02* (2013.01); *Y02T 10/144* (2013.01)

(58) Field of Classification Search
CPC ........ F02B 37/16; F02B 37/162; F02B 37/18; F02B 37/183; F02B 37/186; F02B 37/22; F02B 37/225; F02B 33/44; F02B 33/446; F02M 26/29; F02D 41/06; F02D 41/062; F02D 41/064; F02D 41/065; F02D 41/067; Y02T 10/144; Y02T 10/7216; Y02T 10/7225; Y02T 10/7233; Y02T 10/7005; Y02T 10/7011; Y02T 10/7016;
(Continued)

(56) References Cited

U.S. PATENT DOCUMENTS 2,636,341 A * 4/1953 Buchi ..................... F02B 33/44
                                                       60/610
4,183,216 A * 1/1980 Tanaka ................. F02B 33/446
                                                       60/611
(Continued)

FOREIGN PATENT DOCUMENTS

JP           5-125946 A     5/1993
JP        2010-065656 A     3/2010
(Continued)

*Primary Examiner* — Thai Ba Trieu
*Assistant Examiner* — Jessica Kebea
(74) *Attorney, Agent, or Firm* — Morgan, Lewis & Bockius LLP (57) ABSTRACT

An air intake control system for an engine, which is disposed in an intake line between a compressor of a turbocharger and an intake manifold and adjusts and controls air intake may include a motor for providing torque, a bypass line with a first end connected to the intake line and a second end connected to an external air line for delivering external air into the compressor, and a flow control valve assembly disposed at a divergent point from the intake line to the bypass line and selectively distributing air intake from the compressor to the intake manifold and the bypass line by adjusting a degree of opening of valve members in accordance with an amount of revolution of the motor.

9 Claims, 6 Drawing Sheets

(51) Int. Cl.
*F16K 31/02* (2006.01)
*F16K 31/04* (2006.01)

(58) Field of Classification Search
CPC ........ F16K 31/02; F16K 31/04; F16K 31/046;
F16K 31/0603; F16K 31/0624; F16K
31/0627; F16K 31/0634
USPC ....... 73/114.77, 1, 79, 114.26; 251/251–263;
60/611
See application file for complete search history.

(56) References Cited

U.S. PATENT DOCUMENTS

| | | | | |
|---|---|---|---|---|
| 4,346,728 A * | 8/1982 | Sulzer | ............... | F16K 29/00 |
| | | | | 137/243.6 |
| 4,522,223 A * | 6/1985 | Balsys | ............... | F16K 1/446 |
| | | | | 134/166 C |
| 4,757,834 A * | 7/1988 | Mieth | ............... | F16K 1/446 |
| | | | | 134/166 C |
| 5,796,175 A * | 8/1998 | Itoh | ............... | B60L 3/0023 |
| | | | | 307/10.1 |
| 6,465,974 B2 * | 10/2002 | Watanabe | ............... | F02D 11/105 |
| | | | | 318/400.08 |
| 6,722,128 B1 * | 4/2004 | Adrian | ............... | F02B 37/12 |
| | | | | 123/564 |
| 6,945,240 B2 * | 9/2005 | Kobayashi | ............... | F02B 37/16 |
| | | | | 123/568.21 |
| 7,213,613 B2 * | 5/2007 | Spakowski | ............... | F16K 1/443 |
| | | | | 123/568.2 |
| 7,500,363 B2 * | 3/2009 | Hara | ............... | F02B 37/18 |
| | | | | 123/561 |
| 7,578,128 B2 * | 8/2009 | Miyauchi | ............... | F02B 37/16 |
| | | | | 123/561 |
| 7,631,552 B2 * | 12/2009 | Keski-Hynnila | ............... | G01M 15/05 |
| | | | | 73/114.74 |
| 7,926,335 B2 * | 4/2011 | Wegener | ............... | F02B 37/16 |
| | | | | 73/114.77 |
| 8,387,383 B2 | 3/2013 | Thiery et al. | | |
| 9,127,624 B2 * | 9/2015 | Peters | ............... | F02B 37/18 |
| 2007/0240677 A1 * | 10/2007 | Sasaki | ............... | F16K 1/221 |
| | | | | 123/337 |
| 2011/0031426 A1 * | 2/2011 | Tyler | ............... | F16K 31/046 |
| | | | | 251/251 |
| 2013/0008417 A1 * | 1/2013 | Sankar | ............... | F02D 41/0047 |
| | | | | 123/568.12 |

FOREIGN PATENT DOCUMENTS

| | | |
|---|---|---|
| JP | 2010-090876 A | 4/2010 |
| KR | 10-2004-0031264 A | 4/2004 |
| KR | 10-2010-0076722 A | 7/2010 |
| KR | 10-2013-0083607 A | 7/2013 |

* cited by examiner

AIR INTAKE CONTROL SYSTEM FOR ENGINE AND METHOD OF CONTROLLING THE SAME

CROSS REFERENCE TO RELATED APPLICATION

The present application claims priority to Korean Patent Application No. 10-2014-0070000, filed Jun. 10, 2014, the entire contents of which is incorporated herein for all purposes by this reference.

BACKGROUND OF THE INVENTION

Field of the Invention

The present invention relates, in general, to the control of air intake of an engine, and, more particularly, to an air intake control system for an engine which improves control precision by electronically controlling a valve, improves an engine layout by reducing the number of parts, reduces a manufacturing cost, and has improved reliability by means of fail-safe plans, and a method of controlling the air intake control system.

Description of Related Art

A pneumatic intake air control valve is disposed in an intake line connected between a compressor of a turbocharger and an intake manifold in engines using Compressed Natural Gas (CNG) as fuel in order to control boost pressure.

Figure 1:
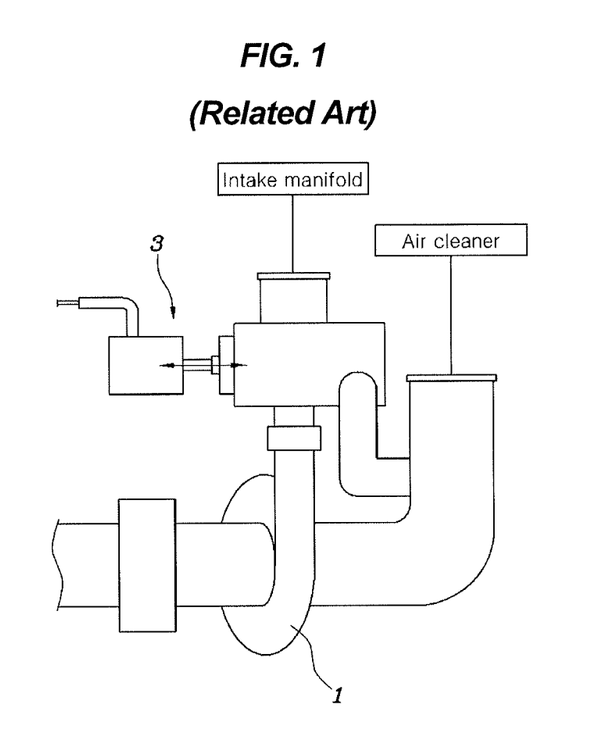
FIG. 1 is a view showing the configuration of a pneumatic control valve according to the related art.

FIG. 1 shows a type of pneumatic intake air control valves, in which the amount of air flowing into an engine (intake manifold) through a compressor 1 is controlled by controlling the degree of opening with a pneumatic valve 3 in accordance with boost pressure of the engine.

However, the pneumatic control valve has a problem in that it has low control precision due to a low control response, is disadvantageous with respect to manufacturing cost because auxiliary parts such as an air regulator, an oversupply control valve, a booster monitoring module, and a pneumatic line are required, and has low reliability due to problems with durability and quality of parts such as durability and leakage of a diaphragm (made of rubber).

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air intake control system for an engine which improves control precision by electronically controlling a valve, improves the layout of an engine by reducing the number of parts, and reduces a manufacturing cost; and a method of controlling the air intake control system.

Further, various aspects of the present invention are directed to providing an air intake control system for an engine which improves reliability of a controller, which is operated by electronic control, by providing a fail-safe plan for the controller, and a method of controlling the air intake control system.

According to various aspects of the present invention, an air intake control system for an engine, which is disposed in an intake line between a compressor of a turbocharger and an intake manifold and adjusts and controls air intake may include a motor for providing torque, a bypass line with a first end connected to the intake line and a second end connected to an external air line for delivering external air into the compressor, and a flow control valve assembly disposed at a divergent point from the intake line to the bypass line and selectively distributing air intake from the compressor to the intake manifold and the bypass line by adjusting a degree of opening of valve members in accordance with an amount of revolution of the motor.

The flow control valve assembly may include an eccentric member fitted on a rotary shaft of the motor and eccentrically rotated, an actuating rod having a first end, which is in contact with an outer side of the eccentric member, and moving straight with the rotation of the eccentric member, a valve housing covering a second end of the actuating rod, having an inside that communicates with an inside of the intake line and an inside of the bypass line, and having steps around an inner side of a joint of the intake line and the bypass line, valve members combined with the actuating rod to move together and opening or closing the intake line and the bypass line to each other by outer edges of the valve members which are brought in contact with or moved away from the steps, when the valve members move, and a return spring providing an elastic restoring force against straight movement of the actuating rod.

The system may further include a position sensor measuring positions of the valve members, and a controller feedback-controlling the degree of opening of the valve members by calculating the degree of opening of the valve members from the positions of the valve members and by operating the motor such that the degree of opening of the valve members is consistent with a desired degree of opening for controlling desired boost pressure of the engine after the engine starts.

The controller may include a DC-DC converter converting power inputted from a battery into power available for the controller.

According to various aspects of the present invention, a method of controlling the air intake control system for the engine of the present invention may include measuring positions of the valve members, and feedback-controlling the degree of opening of the valve members by determining the degree of opening of the valve members from the positions of the valve members and by operating the motor such that the degree of opening of the valve members is consistent with a desired degree of opening for controlling desired boost pressure of the engine after the engine starts.

The feedback-controlling the degree of opening of the valve members may include determining an error in the control system in response to an error signal while the valve members are controlled.

The method may further include determining key-on before the measuring of the positions of the valve members, and controlling the key-on by inputting the desired degree of opening of the valve members as 0% so that the degree of opening of the valve members becomes 0%.

The controlling of the key-on may include determining an error in the control system in response to an error signal while the valve members are controlled.

The method may further include cleaning the valve members by scrapping the valve members, when determining, at the determining of the error, that there is an error in which a difference between the degree of opening of the valve members and the desired degree of opening is a reference value or more and difference duration is a first reference time or more.

The method may further include after the cleaning of the valve members, storing an error code corresponding to an error signal, when the error signal is continuously inputted, and warning a driver of an error, when a number of times of continuously storing an error code due to continuous generation of the error signal exceeds a predetermined number of times.

The method may further include performing failsafe control by inputting the desired degree of opening of the valve members as 0% so that the degree of opening of the valve members becomes 0%, when the number of times of continuously storing the error code exceeds the predetermined number of times.

The method may further include storing an error code corresponding to an error signal, when determining, at the determining of the error, that a difference between the degree of opening of the valve members and the desired degree of opening is within a predetermined value and difference duration is a second reference time or more, and warning a driver of an error, when a number of times of continuously storing the error code due to continuous generation of the error signal exceeds a predetermined number of times.

The method may further include performing failsafe control by inputting the desired degree of opening of the valve members as 0% so that the degree of opening of the valve members becomes 0%, when determining, at the determining of the error, that there is an error in which CAN communication between the controller and an ECU keeps failing for a predetermined period of time, or an error in which temperature of the controller is kept not lower than a predetermined temperature for a predetermined period of time, or an error in which a position signal for the valve members is not inputted from the position sensor.

The method may further include storing an error code corresponding to an error signal, when determining, at the determining of the error, that there is an error in which power inputted from a battery is kept not lower than a predetermined voltage for a predetermined period of time, and warning a driver of an error, when a number of times of continuously storing an error code due to continuous generation of the error signal exceeds a predetermined number of times.

The method may further include controlling key-off by inputting the desired degree of opening of the valve members as 0% so that the degree of opening of the valve members becomes 0% in key-off of a vehicle, after the feedback-controlling of the degree of opening of the valve members, and shutting off power by cutting a power supply for the control system after keeping the controlling of the key-off for a predetermined period of time.

According to the present invention, it is possible to achieve improved control response ability and higher control precision, as compared with pneumatic valves of the related art, by appropriately adjusting and controlling the amount of air intake flowing to an intake manifold and/or a bypass line from a compressor by adjusting the degree of opening of the valve members through electronic control on the motor. Further, it is advantageous in terms of manufacturing cost and layout by minimizing additional parts for achieving a control system. Furthermore, it is possible to improve reliability and quality of a control system by quickly and accurately diagnosing various malfunctions and errors of the control system and providing failsafe control plans against the malfunctions and errors.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
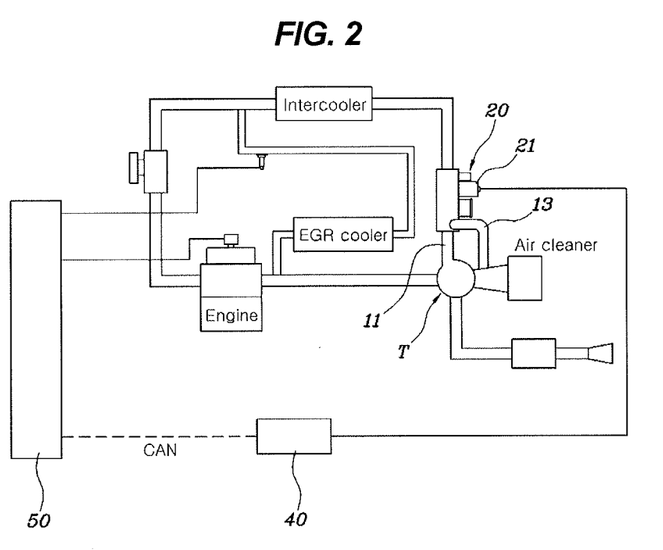
FIG. 2 is a view schematically showing an entire system including an exemplary air intake control system according to the present invention.
Figure 3:
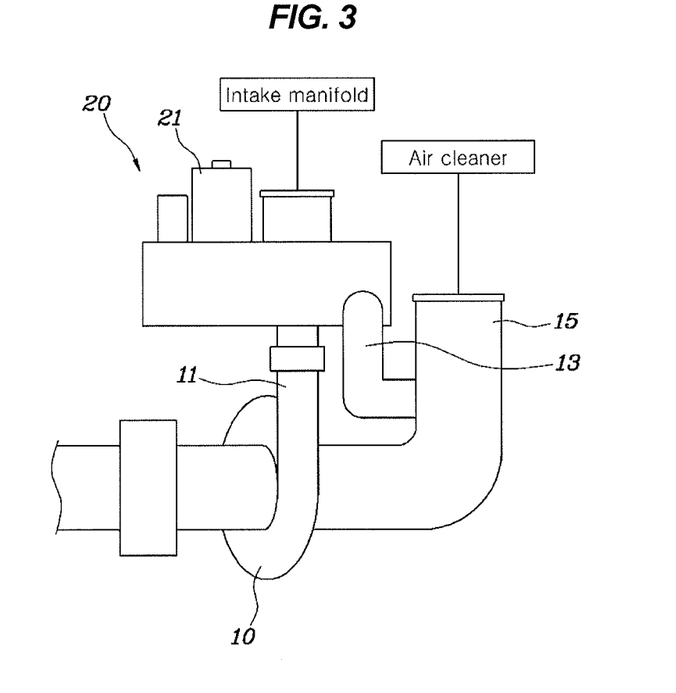
FIG. 3 is a view showing a configuration of the exemplary air intake control system according to the present invention.
Figure 5:
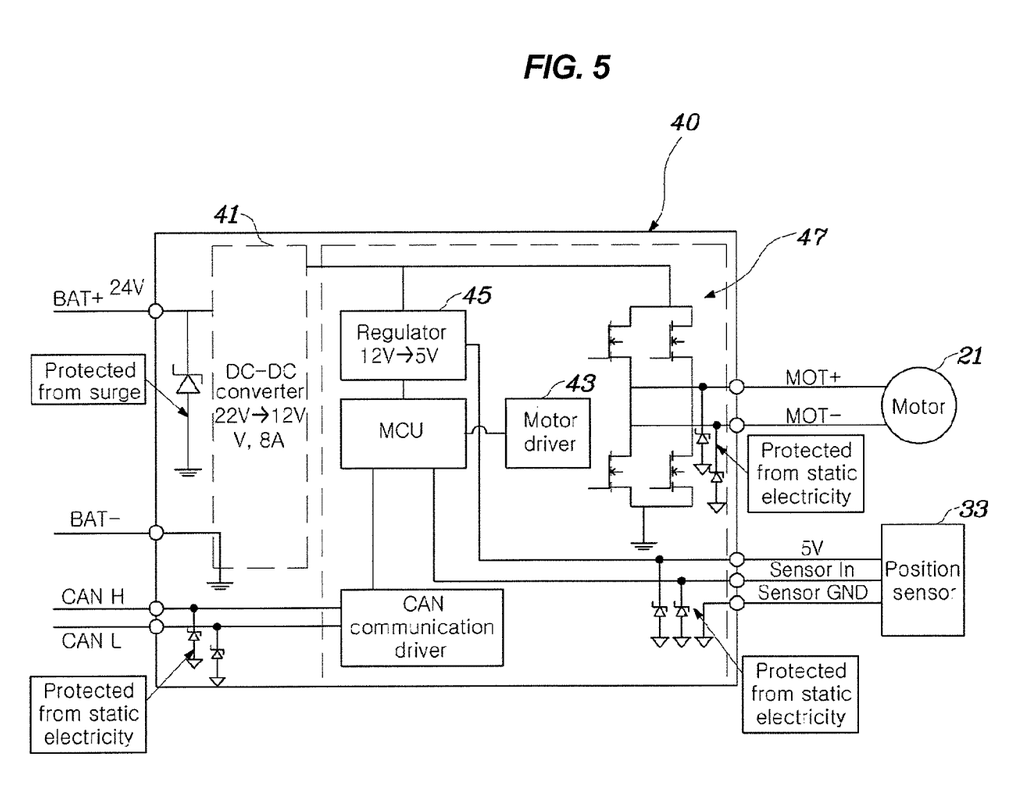
FIG. 5 is a circuit diagram illustrating a configuration of a controller according to the present invention.
Figure 6:
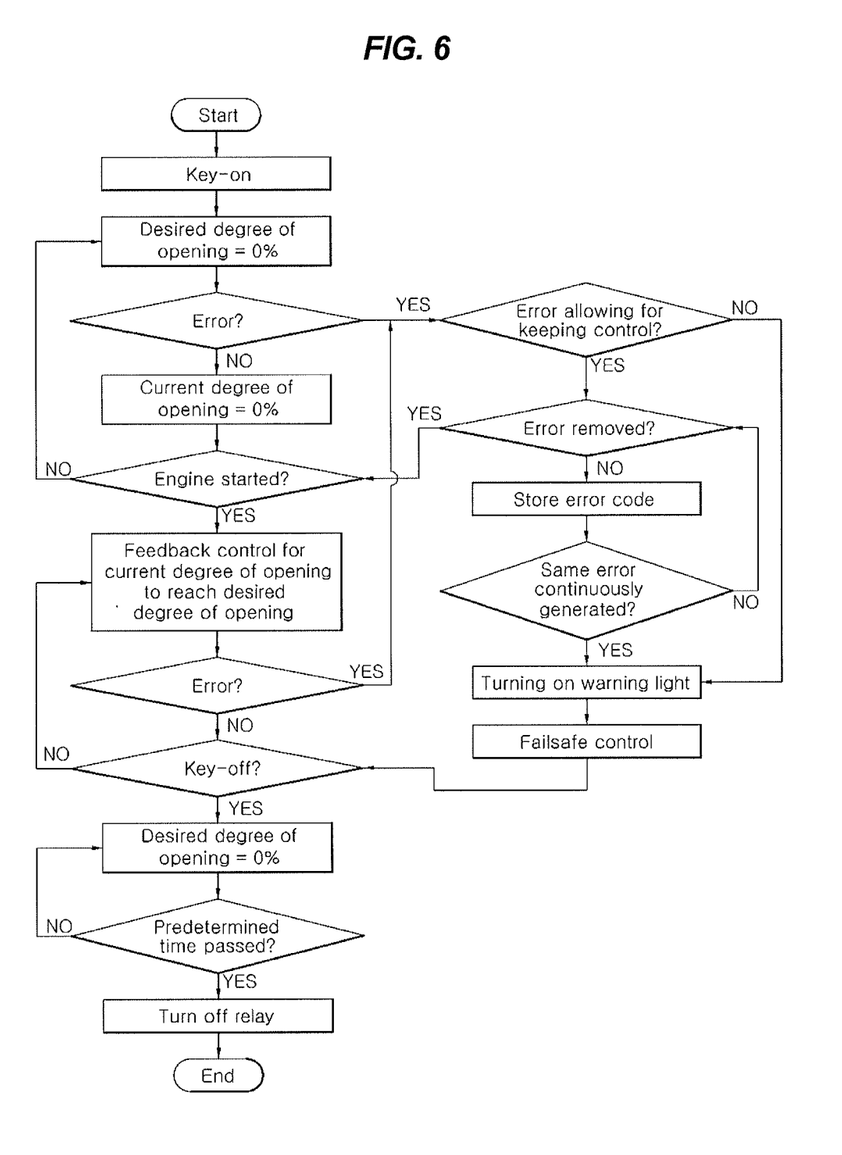
FIG. 6 is a view illustrating control flow of the exemplary air intake control system according to the present invention.

FIG. 2 is a view schematically showing the entire system including an air intake control system according to the present invention, FIG. 3 is a view showing the configuration of air intake control system according to the present invention, FIG. 5 is a circuit diagram illustrating the configuration of a controller according to the present invention, and FIG. 6 is a view illustrating the control flow of the air intake control system according to the present invention.

The air intake control system for an engine broadly includes a motor 21, an intake line 11, a bypass line 13, and a flow control valve assembly 20.

Figure 4:
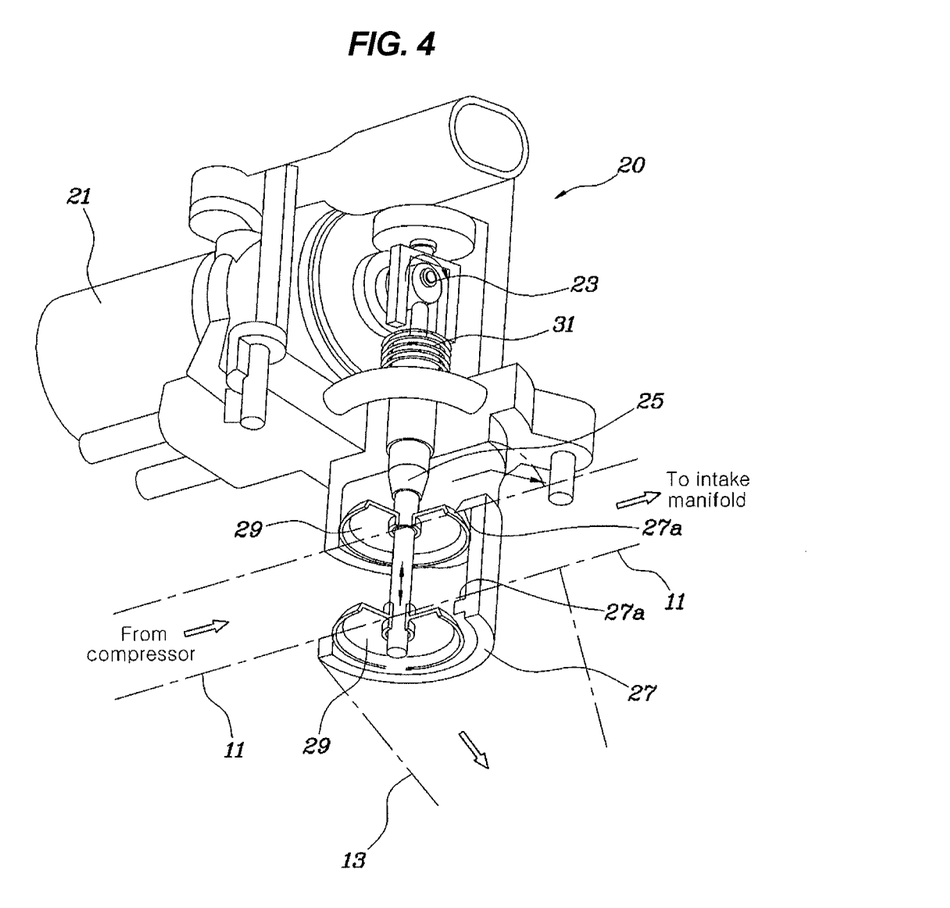
FIG. 4 is a view illustrating the configuration and operation principle of a flow control valve assembly according to the present invention.

Referring to FIG. 2, FIG. 3 and FIG. 4, in detail, the system, which is disposed in the intake line 11 between a compressor 10 of a turbocharger T and an intake manifold and adjusts and controls air intake, includes the motor 21 providing torque, the bypass line 13 with a first end connected to the intake line 11 and a second end connected to an external air line for delivering external air into the compressor 10, and the flow control valve assembly 20 disposed at the divergent point from the intake line 11 to the bypass line 13 and selectively distributing air intake from the compressor 10 to the intake manifold and the bypass line 13 by adjusting the degree of opening of valve members 29 in accordance with the amount of revolution of the motor 21.

That is, the amount of air flowing from the compressor 10 to the intake manifold and/or the bypass line 13 is adjusted and controlled by adjusting the degree of opening of the valve members 29 by means of electronic control of revolution of the motor 21, such that, as compared with existing pneumatic valves, response ability is improved and control precision increases. Further, since there is no need of additional parts, it is advantageous in terms of manufacturing cost and layout, and problems with quality of parts are improved, thereby increasing reliability of the system.

On the other hand, the flow control valve assembly 20 may include an eccentric member 23, an actuating rod 25, a valve housing 27, the valve members 29, and a return spring 31.

In detail, referring to FIG. 3 and FIG. 4, the flow control valve assembly 20 may include the eccentric member 23 fitted on a rotary shaft of the motor 21 and eccentrically rotated, the actuating rod 25 having a first end being in contact with the outer side of the eccentric member 23 and moving straight with rotation of the eccentric member 23, the valve housing 27 covering a second end of the actuating rod 25, having the inside that communicates with the inside of the intake line 11 and the inside of the bypass line 13, and having steps 27a around the inner side of the joint of the intake line 11 and the bypass line 13, the valve members 29 combined with the actuating rod 25 to move together and opening the intake line 11 and the bypass line 13 to each other or closing them by means of their outer edges which are brought in contact with or moved away from the steps 27a, when the valve members move, and the return spring 31 providing an elastic restoring force against straight movement of the actuating rod 25.

In order to close the valve members 29 with the degree of opening of 0%, as the motor 21 is operated by the amount of revolution corresponding to the degree of opening, the eccentric member 23 eccentrically fitted on the rotary shaft of the motor 21 eccentrically rotates, the actuating rod 25 and the valve members 29 combined with the actuating rod 25 move straight to close the bypass line 13 and the intake line 11 to each other, and the edges of the valve members 29 come in close contact with the steps 27a.

Accordingly, with the intake line 11 and the bypass line 13 closed to each other by the valve members 29, the air flowing into the intake line 11 and the front end of the valve housing 27 after being compressed through the compressor 10 is fully discharged to the rear end of the valve housing 27 and the intake line 11 and flows into the intake manifold.

In contrast, in order to increase the degree of opening of the valve members 29 by opening the valve members 29, as the motor 21 is operated by the amount of revolution corresponding to the degree of opening, the eccentric member 23 eccentrically fitted on the rotary shaft of the motor 21 eccentrically rotates, the actuating rod 25 and the valve members 29 combined with the actuating rod 25 move straight to open the bypass line 13 and the intake line 11 to each other, and the edges of the valve members 29 are moved away from the steps 27a.

Accordingly, with the intake line 11 and the bypass line 13 open to each other, the air flowing into the intake line 11 and the front end of the valve housing 27 after being compressed through the compressor 10 is appropriately distributed to the intake line 11 and the bypass line 13 which are connected with the rear end of the valve housing 27 in accordance with the degree of opening of the valve members 29, in which some of the air flows into the intake manifold and the other flows back into the compressor 10 through the bypass line 13.

Accordingly, it is possible to adjust the amount of air flowing into the intake manifold in accordance with the degree of opening of the valve members 29, and thus to adjust boost pressure of an engine.

Further, referring to FIG. 5, the present invention may include a position sensor 33 measuring the positions of the valve members 29 and a controller 40 feedback-controlling the degree of opening of the valve members 29 by calculating the degree of opening of the valve members 29 from the positions of the valve members 29 and by operating the motor 21 such that the degree of opening of the valve members 29 is consistent with a desired degree of opening for controlling desired boost pressure of an engine after the engine starts.

The controller 40, which is connected with an Engine Control Unit (ECU) 50 that is an upper controller by CAN communication, feedbacks the degree of opening of the valve members 29 controlled by the motor 21 and diagnoses an error in the system, when a desired degree of opening is inputted to control the boost pressure at the desired boost pressure inputted from the ECU 50.

To this end, the controller 40 can operate the motor 21 through Pulse Width Modulation (PWM) using a motor driver 43, directly control the forward/backward operations of the valve members 29, using an H-Bridge circuit 47, and feedback-control the degree of opening of the valve members with the position sensor 33 (in a non-contact type), using a regulator 45 (12V→15V), thereby transmitting feedback-controlled information to the ECU 50 through CAN communication.

The controller 40 may include a DC-DC converter 41 that converts power inputted from a battery into power available for the controller.

That is, the controller 40 includes the DC-DC converter 41, such that an electronic control system that is driven by power of 12V can be used with power of 24V in common vehicles.

FIG. 6 is a view illustrating control flow in the air intake control system according to the present invention and a method of controlling an air intake control system of the present invention largely includes a measuring step and a controlling step.

In detail, referring to FIG. 4, FIG. 5 and FIG. 6, the method of controlling an air intake control system for an engine may include a measuring step that measures the positions of the valve members 29, and a controlling step that feedback-controls the degree of opening of the valve members 29 by calculating the degree of opening of the valve members 29 from the positions of the valve members 29 and by operating the motor 21 such that the degree of opening of the valve members 29 is consistent with a desired degree of opening for controlling desired boost pressure of an engine after the engine starts.

That is, when a desired degree of opening corresponding to a desired boost pressure to control the boost pressure of an engine, after a vehicle is started from an off state, the motor 21 is operated under PWM control and the current degree of opening of the valve members 29 is feedback-controlled to reach the desired degree of opening, such that the boost pressure of the engine can be controlled at the desired boost pressure.

In particular, the controlling step of the present invention may include an error determining step that determines an error in the control system in response to an error signal while the valve members 29 are controlled.

For example, the method may include a valve cleaning step that scraps the valve members 29, when the error determining step determines that there is an error in which a difference between the degree of opening of the valve members 29 and the desired degree of opening is a reference value (e.g. 5%) or more and difference duration is a first reference time (e.g. 500 msec) or more.

The scrapping is to reciprocate the valve members 29 predetermined times (e.g. four times) in a predetermined direction with vibrating in order to remove an effort in the valve members 29 by removing foreign substances.

The method may include, after the valve cleaning step, a storing step that stores an error code corresponding to an error signal, when the error signal is continuously inputted and a warning step that warns a driver of an error, when the number of times of continuously storing an error code due to continuous generation of the error signal exceeds a predetermined number of times (e.g. four times).

In the warning step, it is possible to give a warning by turning on a warning light on a cluster. However, when an error signal is not inputted and an error is removed by the scrapping, the control of air intake keeps performed through normal feedback control by the motor 21.

Further, the method may further include a failsafe control step that inputs the desired degree of opening of the valve members 29 as 0% so that the degree of opening of the valve members 29 becomes 0%, when the number of times of continuously storing the error code exceeds a predetermined number of times.

That is, when the error keeps occurring several times, the air intake is stopped from being adjusted and controlled by the control system and the valve members 29 are completely closed, which is a limp home mode for sending the entire air flowing from the compressor 10 to the intake manifold.

As another example, the method may include: a storing step that stores an error code corresponding to an error signal, when the error determining step determines that a difference between the degree of opening of the valve members 29 and the desired degree of opening is within a predetermined value (e.g. 5%) and difference duration is a second reference time (e.g. 2 seconds) or more, and a warning step that warns a driver of an error, when the number of times of continuously storing the error code due to continuous generation of the error signal exceeds a predetermined number of times (e.g. four times).

In the warning step, it is possible to give a warning by turning on a warning light on a cluster.

Further, the method may further include a failsafe control step that inputs the desired degree of opening of the valve members 29 as 0% so that the degree of opening of the valve members 29 becomes 0%, when the number of times of continuously storing the error code exceeds a predetermined number of times.

That is, when the error keeps occurring several times, the air intake is stopped from being adjusted and controlled by the control system and the valve members 29 are completely closed, which is a limp home mode for sending the entire air flowing from the compressor 10 to the intake manifold.

As another example, the method may further include a failsafe control step that inputs the desired degree of opening of the valve members 29 as 0% so that the degree of opening of the valve members 29 becomes 0%, when the error determining step determines that there is an error in which CAN communication between the controller 40 and the ECU 50 keeps failing for a predetermined period of time (e.g. 1 second), or an error in which the temperature of a PCB in the controller 40 is kept not lower than a predetermined temperature (e.g. 140□) for a predetermined period of time (e.g. 2 seconds), or an error in which a position signal for the valve members 29 is not inputted from the position sensor 33 (e.g. 0V is detected at the input terminal of the position sensor 33).

That is, when an error in which the control system cannot control air intake occurs, the air intake is stopped from being adjusted and controlled by the control system and the valve members 29 are completely closed, which is a limp home mode for sending the entire air flowing from the compressor 10 to the intake manifold.

As another example, the method may include a storing step that stores an error code corresponding to an error signal, when the error determining step determines there is an error in which power inputted from a battery is kept not lower than a predetermined voltage (e.g. 36V) for a predetermined period of time (e.g. 2 seconds), and a warning step that warns a driver of an error, when the number of times of continuously storing an error code due to continuous generation of the error signal exceeds a predetermined number of times.

In the warning step, it is possible to give a warning by turning on a warning light on a cluster.

The method may further include a key-on determining step that determines key-on before the measuring step and a key-on controlling step that inputs the desired degree of opening of the valve members 29 as 0% so that the degree of opening of the valve members 29 becomes 0%.

That is, in key-on of a vehicle, when the ECU 50 provides an instruction value for the desired degree of opening of the valve members 29 as 0%, the degree of opening of the valve members 29 is controlled at 0% that is the feedback value of the controller 40 and is maintained until the engine starts.

The key-on controlling step may include an error determining step that determines an error in the control system in response to an error signal while the valve members 29 are controlled.

The details of the error determining step are the same as those of an error determining step after the engine starts, so the error determining step in key-on is not described.

The present invention may further include, after the controlling step, a key-off controlling step that inputs the desired degree of opening of the valve members 29 as 0% so that the degree of opening of the valve members 29 becomes 0% in key-off of a vehicle, and a power shutting-off step that cuts the power supply for the control system by turning off a relay after keeping the key-off controlling step for a predetermined period of time (e.g. 12 seconds).

That is, in key-off of a vehicle, the adjustment and control of air intake by the control system is stopped and the valves 29 are fully closed.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an air intake system for an engine, the air intake system comprising an intake line between a compressor of a turbocharger and an intake manifold, a bypass line with a first end connected to the intake line and a second end connected to an external air line for delivering external air into the compressor; and a flow control valve assembly disposed at a divergent point from the intake line to the bypass line and selectively distributing air intake from the compressor to the intake manifold and the bypass line by adjusting a degree of opening of valve members of the flow control valve assembly, the method comprising:
    measuring positions of the valve members of the flow control valve assembly;
    feedback-controlling the degree of opening of the valve members by determining the degree of opening of the valve members from the positions of the valve members and by operating a motor such that the degree of opening of the valve members is consistent with a desired degree of opening for controlling desired boost pressure of the engine after the engine starts,
    determining at least one error in the control system;
    wherein a first error of the at least one error in the control system is determined in response to a first error signal while the valve members are controlled, the first error signal corresponds to a difference between the degree of opening of the valve members and the desired degree of opening being a reference valve or more and a duration of the difference is a first reference time or more; and
    in response to the first error of the at least one error in the control system being determined, scrapping the valve members to clean the valve members.

2. The method of claim 1, further comprising:
    determining key-on before the measuring of the positions of the valve members; and
    performing the key-on by inputting the desired degree of opening of the valve members as 0% so that the degree of opening of the valve members becomes 0%.

3. The method of claim 1, further comprising:
    after the cleaning the valve members,
    storing an error code corresponding to the first error signal, when the first error signal is continuously inputted; and
    warning a driver of the first error of the at least one error in the control system, when a number of times of continuously storing the error code due to continuous generation of the first error signal exceeds a predetermined number of times.

4. The method of claim 3, further comprising:
    performing failsafe control by inputting the desired degree of opening of the valve members as 0% so that the degree of opening of the valve members becomes 0%, when the number of times of continuously storing the error code exceeds the predetermined number of times.

5. The method of claim 1, further comprising:
    determining a second error of the at least one error in the control system,
    wherein the second error of the at least one error in the control system is determined in response to a second error signal while the valve members are controlled, the second error signal corresponds to a difference between the degree of opening of the valve members and the desired degree of opening is within a predetermined value and duration of the difference is a second reference time or more,
    storing an error code corresponding to the second error signal; and
    in response to the determining of the second error of the at least one error in the control system, warning a driver of the second error of the at least one error in the control system, when a number of times of continuously storing the error code due to continuous generation of the second error signal exceeds a predetermined number of times.

6. The method of claim 5, further comprising:
    performing failsafe control by inputting the desired degree of opening of the valve members as 0% so that the degree of opening of the valve members becomes 0%, when the number of times of continuously storing the error code exceeds the predetermined number of times.

7. The method of claim 1, further comprising:
    determining a second error of the at least one error in the control system;
    performing failsafe control by inputting the desired degree of opening of the valve members as 0% so that the degree of opening of the valve members becomes 0% when the second error of the at least one error in the control system is determined, wherein the second error is one of an error in CAN communication between the controller and an ECU in which the communication keeps failing for a predetermined period of time, an error in which temperature of the controller in which the temperature is kept not lower than a predetermined temperature for a predetermined period of time, and an error in which a position signal for the valve members is not inputted from a position sensor.

8. The method of claim 1, further comprising:
    determining a second error of the at least one error in the control system, wherein the second error of the at least one error in the control system is determined in response to a second error signal, the second error signal corresponds to an error in which power inputted from a battery is kept not lower than a predetermined voltage for a predetermined period of time;
    storing an error code corresponding to the second error signal; and
    warning a driver of the second error of the at least one error in the control system, when a number of times of continuously storing the error code due to continuous generation of the second error signal exceeds a predetermined number of times.

9. The method of claim 1, further comprising:
    performing key-off by inputting the desired degree of opening of the valve members as 0% so that the degree of opening of the valve members becomes 0% in key-off of a vehicle, after the feedback-controlling of the degree of opening of the valve members; and shutting off power by cutting a power supply for the control system after keeping the performing of the key-off for a predetermined period of time.

* * * * *